United States Patent [19]

Henry et al.

[11] Patent Number: 4,571,497
[45] Date of Patent: Feb. 18, 1986

[54] METHOD FOR CONTINUOUSLY MEASURING THE PERIMETER OF WRAPPED OBJECTS

[75] Inventors: James W. Henry, Kingsport; Robert C. Mumpower, Gray, both of Tenn.

[73] Assignee: Eastman Kodak Company, Rochester, N.Y.

[21] Appl. No.: 409,754

[22] Filed: Aug. 19, 1982

[51] Int. Cl.⁴ .......................... A24C 1/42; F16H 9/12
[52] U.S. Cl. .................................... 250/560; 131/284; 493/40; 493/4; 493/37
[58] Field of Search ..................... 131/339, 284, 906; 493/4, 11, 18, 40, 37; 250/560, 223 R; 101/DIG. 25

[56] References Cited

U.S. PATENT DOCUMENTS 3,812,349 5/1974 Gugliotta et al. ............ 250/223 R
4,170,003 10/1979 Danielsson et al. ................ 250/560
4,291,712 9/1981 Koster et al. ........................ 131/339
4,486,186 12/1984 Grumer .................................. 493/4

Primary Examiner—David C. Nelms
Assistant Examiner—J. Jon Brophy
Attorney, Agent, or Firm—John F. Stevens; Daniel B. Reece, III

[57] ABSTRACT

Disclosed is a method of continuously determining the perimeter of an elongated object of generally uniform cross section which comprises wrapping the object with a sheet of flexible material having a pair of detectable parallel lines formed thereon, such that the lines extend axially parallel to the object, placing detection means in position to detect the lines, the detection means being capable of determining the distance between the lines, moving the object and the detection means relative to each other in a manner such that continuous detection of the lines and measurement of the distance therebetween occurs, and correlating the measured distance between the lines to the perimeter of said object.

10 Claims, 5 Drawing Figures

METHOD FOR CONTINUOUSLY MEASURING THE PERIMETER OF WRAPPED OBJECTS

DESCRIPTION

1. Technical Field

This invention relates to a method for continuously monitoring the peripheral measurement of wrapped objects. It has particular utility in instances where an object is wrapped with sheet material, such as in the case of cigarette filters, where a bundle of fibers is wrapped with paper.

In the manufacture of cigarette filter plugs, it becomes necessary to assure that the diameter or circumference of the wrapped plug conforms to the dimensions of the subsequent cigarette resulting from the assembly of the filter plug with the cigarette.

In the process of measuring the circumference of the filter plug according to this invention, two or more lines running in a direction parallel to the long dimension of the paper are imprinted on the filter wrap paper. Since the paper is wrapped around the filter plug core fibers so that the long aspect of the paper runs parallel with the filter plug axis, these lines run longitudinally along the filter rod. By positioning the lines so that they fall near the overlap where the seam is made in the filter rod wrapper as it surrounds the core fiber bundle, means are offered to reference a dimensional measuring system. By determining the separation of the lines positioned on either side of the overlapped seam it is possible to determine the circumference of the filter rod, since the lines are placed a known distance apart and the circumference is composed of this known distance plus the measured distance between the lines as they appear separated by the overlapped seam. Through the use of video measuring apparatus such as a standard television camera or a linear array solid-state video measuring device, the spacing between the two lines separated by the seam can be accurately determined. If four lines are imprinted, the measurement between the outer lines and the inner lines can be used to determine the extent of stretching of the paper, thereby offering a means of accurately compensating for the stretch of the paper in the measurement of the filter rod circumference. Should electronic means not be acceptable, an optical measuring device consisting of either a magnifying lens with incorporated reticle or a projection screen device incorporating a scale for measurement may be used.

2. Background Art

Earlier methods of determining the diameter or circumference of a cigarette filter plug have utilized an air gauge device which requires that the plug be encircled by a pressurized annulus which is arranged to measure the amount of air escaping from the annular gap between the outer circumference of the filter plug and the inner diameter of the annulus. Such a device is operable as long as the circumference wrap of the filter plug is airtight. Such an arrangement permits pressure to build up due to the narrowness of the annular gap between the encircling annulus and the filter rod. If air is permitted to escape via means other than the gap, the measuring system is not accurate. This is the case when the paper forming the outer surface of the filter rod is porous. With the advent and need for a porous outer wrap for the filter plug rather than the airtight wrap used in earlier versions of the filter plug, improved means of measuring the diameter of the filter plug are required. These means must be unaffected by porosity of the filter plug wrapping paper.

DESCRIPTION OF THE INVENTION

According to the present invention, there is provided a method of continuously determining the perimeter of an elongated object of generally uniform cross section which comprises (a) wrapping the object with a sheet of flexible material having a pair of detectable parallel lines formed thereon, such that the parallel lines extend generally axially parallel to the object, (b) placing detection means in position to detect the lines, the detection means having means for determining the distance between the lines, (c) moving the object and the detection means relative to each other in a manner such that continuous detection of the lines and measurement of the distance therebetween occurs, and (d) correlating the measured distance between the lines to the perimeter of the object.

This project has specific utility in the manufacture of cigarette filter rods in which a fibrous core of material is wrapped in a porous paper wrapper It has utility also in the diameter control of those tubular elements which in combination form the structure of a cigarette. Although it will be apparent to those skilled in the art that the method disclosed herein is useful in many other fields where perimeter measurements must be continuously monitored, for the sake of simplicity the method will be described herein with respect to cigarette filter rods.

The process and apparatus described can be used in any manufacturing process where webs of elongated flat material are converted into tubing by rolling the flat material around the longitudinal axis of the web. In the manufacture of cigarette filter plugs, web material is rolled into a tube to form the wrapper for fibrous filter material which serves as the core of the filter. In the manufacture of tubing from paper, plastic, fabric, glass, etc., where a flat web is rolled from a tubing by lapping over the edges of the web material and sealing the edges together, the imposition of lines along the back side of the web material will permit automatic control of the circumference and thus the diameter of the tubing.

The means whereby such a circumferential determination can be made from the filter plug is based on the imposition of two or more lines on the wrapper paper. These lines run along the paper parallel to the edges of the paper as it is withdrawn from the paper roll. The paper is folded into an elongated cylinder which encloses the fiber filter plug core. Thus, lines imprinted on the paper and parallel to the long dimension of the paper will run parallel to the axis of the filter plug. By arranging the lines so that they fall near the overlapping seam of the filter rod wrapper, but on opposite sides of the seam, it is possible to use them to determine the circumference of the filter rod simply by measuring the distance between them and adding the known distance between the lines as they were imprinted on the paper.

BEST MODE FOR CARRYING OUT THE INVENTION

Figure 1:
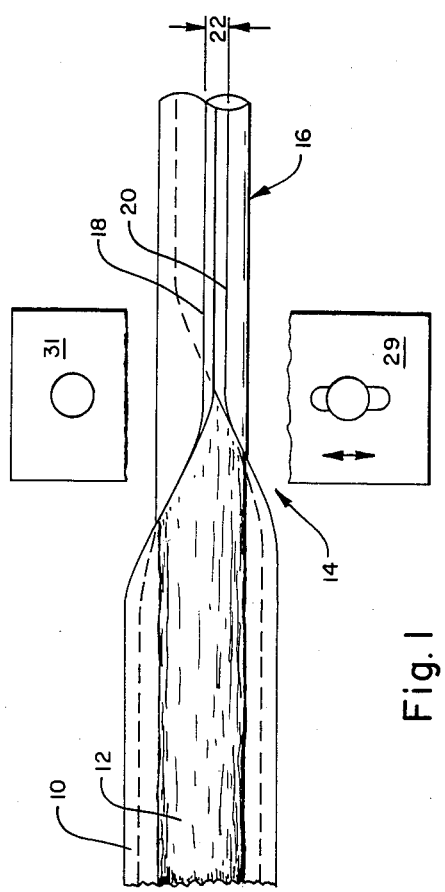
FIG. 1 is a partial plan view of cigarette filter material being wrapped with sheet material having lines printed thereon in accordance with this invention.
Figure 2:
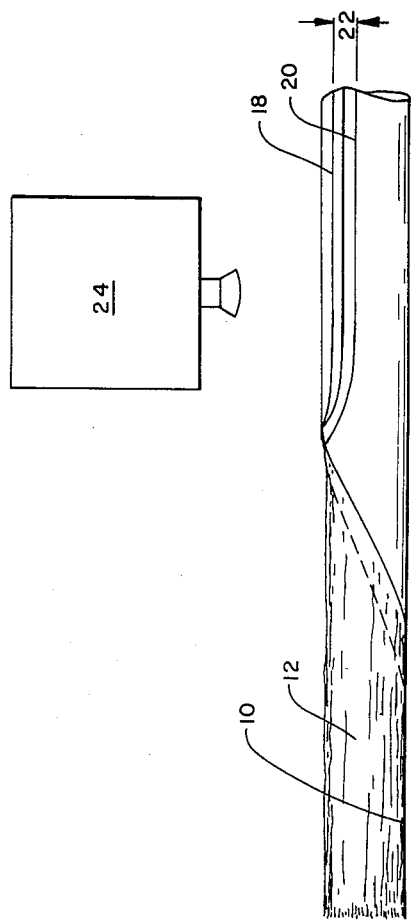
FIG. 2 is an elevational view of the cigarette filter material shown in FIG. 1, also illustrating means for measuring the distance between the printed lines.

As will be noted from FIG. 1, the paper 10 is flat and elongated prior to being wrapped around the core material of the filter plug 12. At point 14, the paper is caused to roll and gradually close until at point 16 using conventional equipment well known to those skilled in the art, it has become a cylinder with a seam formed by overlapping the paper where it is joined by an adhesive stripe.

Lines 18 and 20 are parallel with each other and approximately aligned with the edges of the paper. The two lines 18 and 20 are imprinted on the paper, and separated by the distance 22. The Lines 18 and 20 are now situated on either side of the seam.

Electronic means 24 are provided for determining the distance between the lines 18 and 20. A line array video camera such as manufactured by the Reticon Corporation of Sunnyvale, Calif., is positioned above the continuous rod prior to the rod being segmented into individual plugs. The electronic output of the array video camera can be appropriately processed and used to readjust the controls which affect the circumference of the filter rod. Thus, the filter rod diameter control can be fully automatic.

Should automatic control of filter rod diameter not be required, an alternate process employs a projection lens and screen (not shown). The image of the lines greatly magnified is projected on a screen. These are compared to a built-in scale imposed on the screen and the operator judges the degree of adjustment needed to bring the two lines within control limits. When the lines are appropriately adjusted to the proper degree of separation, the process is in control.

Figure 3:
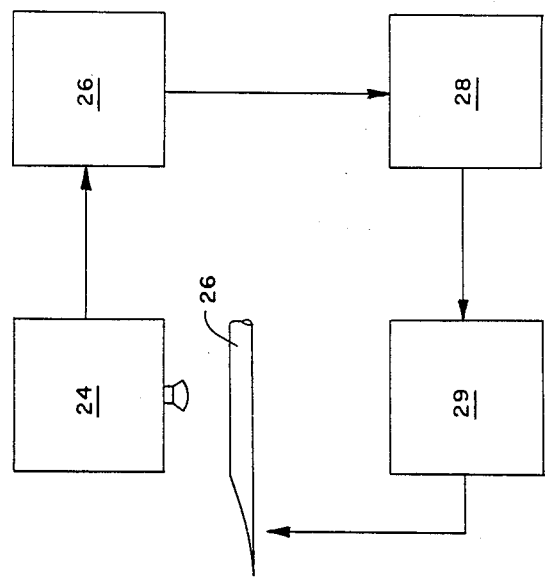
FIG. 3 is a diagrammatic view of an automated system for controlling circumference of the wrapped material.

In a fully automated system incorporating the video camera using either a linear array of photocells or a full video tube camera, the arrangement is as shown in FIG. 3. Here the filter rod 26 is imaged on the sensitive medium of the video camera 24. The video signal is sent to signal processor 26 where it is compared with the desired line separation information. An error signal may be sent from this processing unit to the electrical signal-to-mechanical signal translator 28 where it may be translated into either a pneumatic, hydraulic, or electrical signal which is supplied to the control element 29 which adjusts the filter rod circumference. FIG. 1 illustrates in diagrammatic form, how the control element 29 may be used to adjust the perimeter of the rod by moving adjustable trumpet folder 29 with respect to stationary trumpet folder 31. The curvature details are not shown for the trumpet folers, but they are well known to those skilled in the art.

Figure 4:
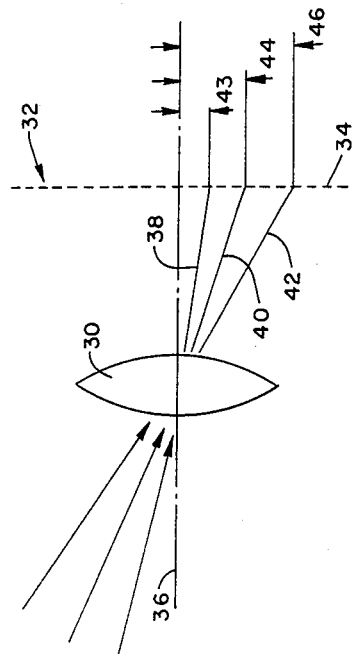
FIG. 4 is a diagrammatic view illustrating the reception of a reflected beam onto an arrangement of photoelectric sensor elements.
Figure 5:
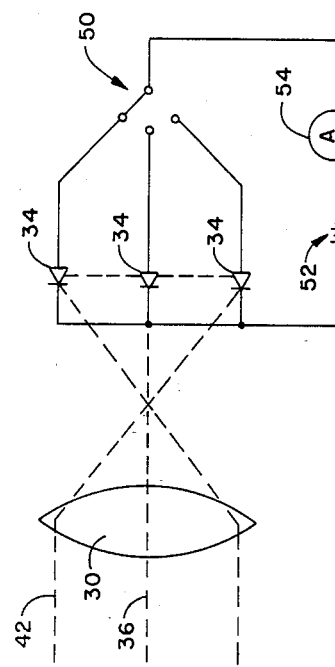
FIG. 5 is a view similar to FIG. 3, illustrating a greatly reduced number of photoelectric sensor elements, and the principal of operation of a line array video camera.

Use of the line array video camera such as illustrated in FIGS. 3-5 (well known in the art and commercially available) as a means of measuring the distance between the two lines situated on either side of the lap seam joining the two edges of the wrapper paper is based on the construction of the linear array in the camera. The principal of operation of such a camera is illustrated in FIGS. 4 and 5. The camera focuses the reflected beam by means of lens 30, onto a plate 32 having a plurality of photoelectric sensor bars 34, which are activated to generate an electrical signal proportional to the distance between the first bar illuminated, or the last bar left dark, and the beginning of the photoelectric sensor array. The camera and light projection source are aligned so that the furthermost level to be determined as to distance by the system produces an imaged spot of light which falls upon the first photoelectric sensor in the array. The distance between this first sensor and the other sensors in the array is then determined by counting the number of pulses which must be applied to the array in order to effect stepping from one photosensor to another, thus effectively switching from sensor to sensor. Those sensors which are not illuminated due to the darkness of the line projected on them may be detected and the number of steps necessary to provide the switching required recorded as a measure of the distance between the first darkened sensors and the second darkened sensors in the array. If the target is positioned at a distance from the camera such that it can effectively be considered indeterminate (i.e., infinity distance), the reflected image will not fall upon the initial photoelement in the array and no count signal will be produced. If the angle is very small, a relatively small number of bars are activated, indicated at 38, and the signal generated is proportionally small. If, however, the angle increases, as by line 40 or line 42, more bars are activated at indicated by distance 44 and 46 and proportionally larger signals are produced. Calculating devices can be calibrated to read the distance from light source 20 to the material level 12.

In a typical camera, 512 photodiode elements are arrayed with a spacing such that about 0.001 inch exists between each element. These elements are about 0.001 inch wide and about 0.10 inch long. A photographic lens focuses the image of the two lines on the linear array. The normal lighter color of the wrapper paper results in the bulk of the elements receiving sufficient light so that they are fully activated. Where the darker lines are present, the elements do not receive much light and these elements are not fully activated. The elements compose links in a series electrical circuit where the degree of activation of the element results in a greater or lesser flow of electrical current through the series circuit. A single resistor is incorporated into the series circuit and each of the photoelectric elements is sequentially switched into the circuit due to the form of the array. As each element is switched into the circuit, the resistor develops a voltage commensurate with the amount of current permitted to flow through it by the photoelement. A large voltage is present for the fully lighted photoelements. A markedly lower voltage is present when those elements shadowed by the lines are in the circuit.

The photoelements are switched into the circuit and out of the circuit by a repeating pulse. By counting the number of pulses which occur between the voltage decline which takes place on sensing the first line and that which takes place on sensing the second line, it is possible to obtain a precise measurement of the distance between the lines. The precise placement of the photoelements in the array makes this possible. Essentially, the photoarray measures by counting elements not activated or activated by the dark or light image which is to be measured.

As an example of the invention, a cigarette filter plug machine is fitted with an imprinting device consisting of a lithographic offset roll and blanket, a permanent plate bearing an image of two lines precisely separated by the distance of 22 millimeters. A black ink is used to imprint the paper. The tack of the ink is reduced to the point that the porous paper on which it is imprinted exhibits no tendency to pick.

Once through the imprinting stage, the paper is carried to the point where it encircles the fibrous filter core and the seam is formed with a 2-millimeter overlap of the paper in the seam. After formation of the continuous filter rod, the rod is passed under the lens system of a Reticon linear array camera connected to a Reticon signal processing control unit. The controls of the Reticon control unit are adjusted to respond to a first black and second black condition and to count the number of photoelements arrayed between the first and second black (lines) condition. There are 512 lines or photoelements in the Reticon linear array. The camera is spaced from the filter rod sufficiently to permit a calibration of the number of elements existing between the projected images of the lines imprinted on the filter rod. This calibration permits 450 lines to exist between the first and second black images. The setpoint of the control unit is adjusted so that departure of 20 lines plus or minus from this adjustment results in triggering of the warning signal attached to the control system indicating that the lines are too close together or too far apart. The number of photoelements chosen correspond to a normal correct displacement between the lines imprinted on the filter rod of 5 millimeters.

When the filter plug machine is operated and the circumference of the filter rod being made is less than the desired 27 millimeters, the distance between the two lines is smaller by the number of millimeters deficient in the circumference. Similarly, an increase in circumference is accompanied by an increase in spacing measured between the two lines. Using the electronic readout system permitted adjustment of the lines until they match the lines assigned number of photoelements. Automatic feedback of the electronic signal to control this setting may be accomplished by those skilled in the art.

In another instance, a cigarette filter plug manufacturing machine is equipped with the printer and linear array described above. The experiment is run exactly as before with the exception that the digital count produced is introduced into a digital comparitor system composed of eight Type 7485 digital comparitor chips. The outputs of these chips are arranged to provide a positive output consisting of a logical one signal when the counter contents exceed the preset indication compared to the counter contents. This preset indication is provided by an array of eight digital switches producing a binary coded decimal output representative of each of the decimal inputs dialed into the switches. The digital comparitor also provides a separate logic one output for a determination that the counter contents are less than those of the switch array. Each of the logic one signals is fed through a separate terminal and consist of a voltage which falls to about 1.4 volts for a signal indicating no output and 5 volts for a signal indicating output. These signals are supplied to solid-stage zero crossover relays which are activated by light-emitting diodes optionally connected to amplified phototransistors. The logic one signals are used to operate the light-emitting diodes of the relays. Thus, the presence of a logic one signal results in activating a light-emitting diode with the ultimate result that the solid-state relay is closed, permitting current to flow to an impulse motor producing one increment of movement for each impulse received. The impulse motor is arranged to increase the diameter of the filter rod when the logic one signal indicates that the rod diameter is less than the set point diameter. It also reduces the diameter if the logic one signal indicates that the rod is larger than the setpoint. Because of the frequent updating of information by the linear array video system measuring the distance between the two lines imprinted on the wrapper paper, an essentially continuous control of the rod diameter is achieved.

Use of two lines only with paper prone to stretch may sometimes result in errors in diameter determination. For this reason, it may be desirable to use more than two lines in the printed array of lines imposed on the filter rod wrap. The extra lines are precisely positioned with relation to the primary lines imprinted. If the paper stretches in a uniform manner, it then becomes possible to determine the extent of stretching and to compensate in the measurement process for this stretch. This may be done by measuring the distance between lines printed on the paper and using the stretch coefficient to correct for any error which would be imposed by the paper stretching around the core of the filter rod.

Porosity of the paper can, in some instances, result in diffusion of the inked lines on the paper. This degradation of the line edge can be greatly reduced by resort to low-tack lithographic inks and the lithographic printing process rather than a fluid ink printed from metal dies such as would be done using the letterpress or gravure process. In these latter processes, the ink is quite fluid in character and more prone to spread in a porous uncoated paper such as is desirable for more advanced filter rod construction.

It will be obvious to those skilled in the art that lines other than those printed in ink may be used in the practice of this invention. For example, magnetic lines, metal reflective, fluorescent, and electrically conductive lines may be applied to the paper.

It is possible to preprint the wrapper paper; however, in such an instance, it would be most desirable to incorporate the extra lines required in order to compensate for any dimensional change in the paper due to stretching or humidity effects. Further, it would be desirable to determine precisely the separation of the lines on the preprinted paper prior to using it in the filter plug-making machine. The likelihood of large error due to stretching or humidity effects is greatly reduced by resorting to printing immediately before the paper enters the plug-making machine.

The measurement system will function well using a linear array video camera, an area array video camera, and an electron beam scanned Vidicon television tube camera. Video cameras of other design are also operable provided the scanning of the image area is precise. Flying spot image transducers can be used to pick up the image of the lines printed on the paper.

In addition to the television techniques mentioned, tracking photoelectric cell arrangements to measure the distance between the two lines may also be utilized.

Optical means, such as projection microscopes, measuring microscopes, and traveling microscopes can be used to determine the separation of the lines. A crude determination of line separation can be had using moire patterns where a number of parallel lines are utilized in the imprinted array and analyzed by a similar pattern imposed on a transparent viewing screen. The methods mentioned utilizing the optical techniques are useful for measurement of the line separation. They offer less utility as a means of pickup of a signal suitable to provide automatic control of the filter rod diameter.

The invention has been described in detail with particular reference to preferred embodiments thereof, but it will be understood that variations and modifications can be effected within the spirit and scope of the invention.

We claim:

1. Method of continuously determining the perimeter of an elongated object of generally uniform cross section which comprises
   wrapping said object with a sheet of flexible material having a pair of detectable parallel lines formed thereon, such that said parallel lines extend generally axially parallel to said object,
   placing detection means in position to detect said lines, said detection means having means for determining the distance between said lines,
   moving said object and said detection means relative to each other in a manner such that continuous detection of said lines and measurement of the distance therebetween occurs, and
   correlating the measured distance between the lines to the perimeter of said object.

2. Method according to claim 1 wherein said lines are printed with an optically detectable ink.

3. Method according to claim 1 wherein said detection means is a line array video camera having means for receiving reflected light on an arrangement of photoelectric sensor elements connected in a manner such that displacement of the reflected light from a predetermined position on said element arrangement is sensed electronically by counting the number of sensor elements between the original and displacement positions.

4. Method according to claim 1 comprising the step of adjusting the perimeter of said object in response to detection of a change in distance between said lines.

5. Method of continuously determining the perimeter of an elongated object of generally uniform cross section which comprises
   (a) wrapping said object with a sheet of flexible material having a pair of detectable parallel lines formed thereon, such that said parallel lines extend generally axially parallel to said object,
   (b) placing a line array video camera detection means in position to detect said lines,
   (c) moving said object and said detection means relative to each other in a manner such that continuous detection of said lines occurs,
   (d) receiving reflected light from said line on an arrangement of photoelectric sensor elements connected in a manner such that displacement of the reflected light from a predetermined position on said element arrangement is sensed electronically by counting the number of sensor elements between the original and displacement positions,
   (e) generating an electrical signal which is proportional to the number of sensor elements counted, and
   (f) using said electrical signal to determine the distance between said lines, and
   (g) correlating the measured distance between the lines to the perimeter of said object.

6. Method according to claim 5 wherein said lines are printed with an optionally detectable ink.

7. Method according to claim 5 wherein said detection means is a line array video camera having means for receiving reflected light on an arrangement of photoelectric sensor elements connected in a manner such that displacement of the reflected light from a predetermined position on said element arrangement is sensed electronically by counting the number of sensor elements between the original and displacement positions.

8. Method according to claim 5 comprising the step of adjusting the perimeter of said object in response to detection of a change in distance between said lines.

9. Method according to claim 1 wherein said object is a cigarette filter rod.

10. Method according to claim 5 wherein said object is a cigarette filter rod.

* * * * *